US011775362B2

(12) United States Patent
Kumar et al.

(10) Patent No.: US 11,775,362 B2
(45) Date of Patent: Oct. 3, 2023

(54) CONTENT PROVISIONING TO VIRTUAL MACHINES

(71) Applicant: VMware, Inc., Palo Alto, CA (US)

(72) Inventors: Ravindra Kumar, San Jose, CA (US); Yogendra Baldev Bhasin, Fremont, CA (US); Kevin Scott Christopher, Sunnyvale, CA (US); Petr Vandrovec, Cupertino, CA (US); Ming Hua Zhou, Issaquah, WA (US)

(73) Assignee: VMWare, Inc., Palo Alto, CA (US)

(*) Notice: Subject to any disclaimer, the term of this patent is extended or adjusted under 35 U.S.C. 154(b) by 260 days.

(21) Appl. No.: 16/660,435

(22) Filed: Oct. 22, 2019

(65) Prior Publication Data

US 2021/0117255 A1  Apr. 22, 2021

(51) Int. Cl.
  *G06F 9/455* (2018.01)
  *G06F 9/54* (2006.01)
  *H04L 9/40* (2022.01)

(52) U.S. Cl.
  CPC .......... *G06F 9/547* (2013.01); *G06F 9/45558* (2013.01); *H04L 63/10* (2013.01); *G06F 2009/45587* (2013.01)

(58) Field of Classification Search
  CPC ................ G06F 9/547; G06F 9/45558; G06F 2009/45587; H04L 63/10
  See application file for complete search history.

(56) References Cited

U.S. PATENT DOCUMENTS

| | | | | |
|---|---|---|---|---|
| 7,802,000 | B1* | 9/2010 | Huang | H04L 61/106 709/228 |
| 9,047,254 | B1* | 6/2015 | Kobyakov | G06F 16/95 |
| 2002/0143888 | A1* | 10/2002 | Lisiecki | H04L 67/1095 709/217 |
| 2011/0258532 | A1* | 10/2011 | Ceze | G06F 16/9574 715/234 |
| 2012/0209946 | A1* | 8/2012 | McClure | H04W 4/50 709/217 |
| 2013/0339949 | A1* | 12/2013 | Spiers | G06F 9/45558 718/1 |
| 2014/0137180 | A1* | 5/2014 | Lukacs | G06F 21/53 726/1 |
| 2015/0339144 | A1* | 11/2015 | Cao | G06F 9/45558 718/1 |
| 2017/0177650 | A1* | 6/2017 | Devine | G06F 16/2455 |
| 2020/0106669 | A1* | 4/2020 | Dhillon | H04L 63/029 |

* cited by examiner

*Primary Examiner* — Emerson C Puente
*Assistant Examiner* — Jonathan R Labud
(74) *Attorney, Agent, or Firm* — Thomas Horstemeyer, LLP (57) ABSTRACT

Disclosed are various embodiments for providing content to virtual machines. A request for content can be received, wherein the request originates from a virtual machine hosted by the computing device, comprises a unique identifier for the content, and is received from the virtual machine through an inter-process communication mechanism. The unique identifier can be validated. Content can then be retrieved using the unique identifier. A copy of the content can then be provided to the virtual machine in response to validation of the unique identifier, the content being provided to the virtual machine through the inter-process communication mechanism.

20 Claims, 5 Drawing Sheets

CONTENT PROVISIONING TO VIRTUAL MACHINES

BACKGROUND

Virtual machines often require additional configuration when they are first instantiated and executed. For example, the operating system or applications installed on the virtual machine may need to be updated or patched when the virtual machine is first executed. As another example, various configuration options or policies may need to be applied to the virtual machine to configure in a manner desired by the operator of the virtual machine. However, the virtual machine may not have access to a network connection to allow the virtual machine to update and configure itself. For example, the virtual machine may not have the appropriate network configuration settings to allow the virtual machine to use a network connection. As another example, a network access policy could place the virtual machine in a quarantined state, whereby the virtual machine is prohibited from accessing the network until the operating system or applications installed on the virtual machine are fully patched.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for distributing content to virtual machines which do not have network access to the content. Applications executing on a virtual machine can use inter-process communication mechanisms to send a request to a host machine for content. The host machine can then retrieve the content (e.g., from a cache or from a network accessible location) and provide it to the virtual machine using inter-process communication mechanisms. Accordingly, a virtual machine which does not have network access (e.g., because a network interface is not yet configured) or is blocked from accessing a network (e.g., as a result of a policy preventing access until certain conditions are satisfied) can still receive content that may be accessible from the network (e.g., security policies, software updates or patches, etc.). In the following discussion, a general description of the system and its components is provided, followed by a discussion of the operation of the same.

Figure 1:
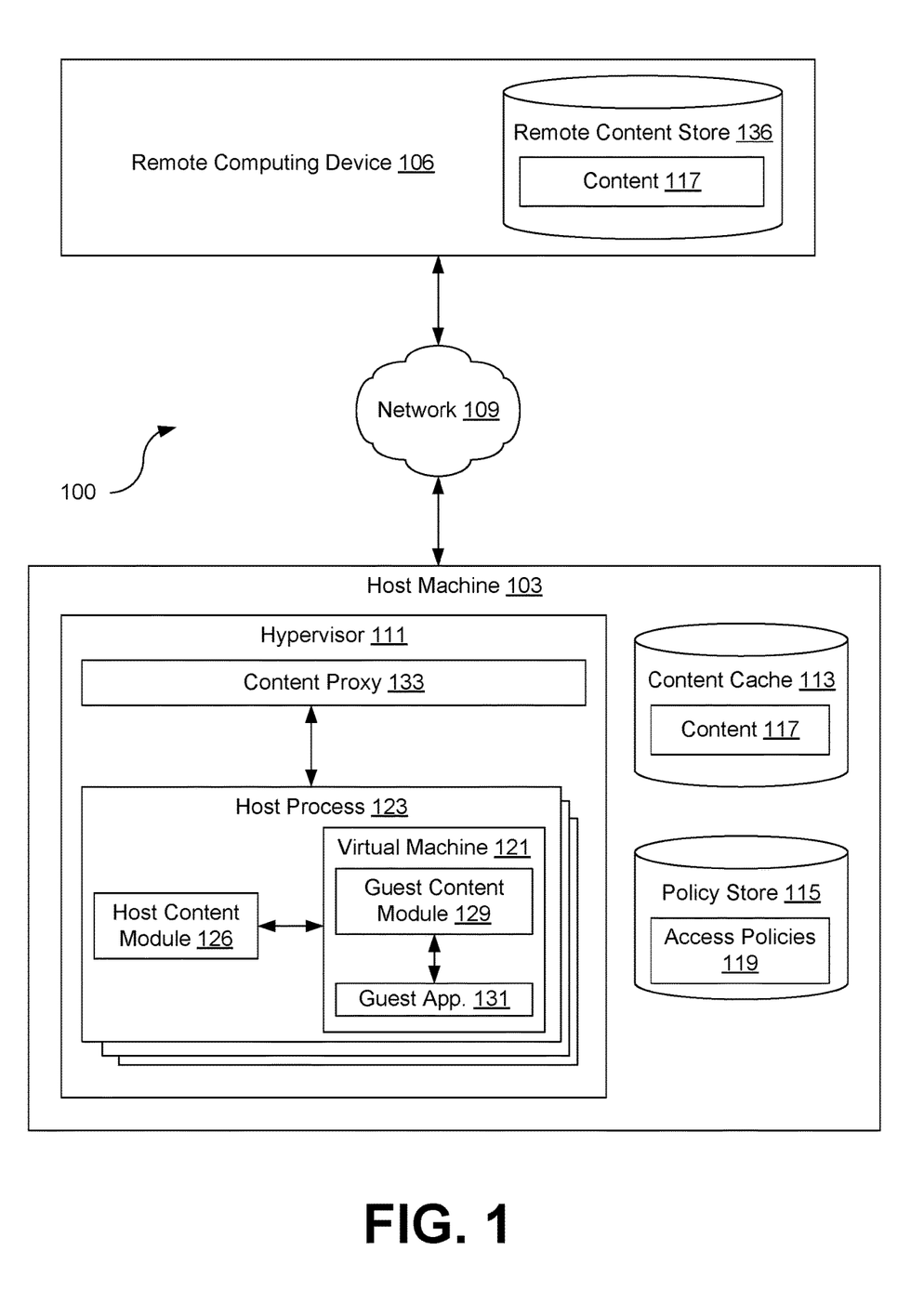
FIG. 1 is a drawing of a network environment according to various embodiments of the present disclosure.

With reference to FIG. 1, shown is a network environment 100 according to various embodiments. The network environment 100 includes a host machine 103 and a remote computing device 106, which are in data communication with each other via a network 109. The network 109 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The host machine 103 and the remote computing device 106 can be representative of one or more computing devices that include a processor, a memory, and/or a network interface. For example, the computing devices can be configured to perform computations on behalf of other computing devices or applications. As another example, such computing devices can host and/or provide content to other computing devices in response to requests for content.

Various applications or other functionality can be executed by the host machine 103 and various data can be stored by the host machine 103. The components executed by the host machine 103 can include a hypervisor 111. The data can be stored in various data stores, such as a content cache 113 and/or a policy store 115. The content cache 113 and/or policy store 115 can be representative of a plurality of data stores, which can include relational databases, object-oriented databases, hierarchical databases, hash tables or similar key-value data stores, as well as other data storage applications or data structures. Although the content cache 113 and the policy store 115 are depicted as separate entities, they can be combined into or implemented as a single data store. The data stored in the content cache 113 and/or policy store 115 is associated with the operation of the various applications or functional entities described below. This data can include content 117, access policies 119, and potentially other data.

The hypervisor 111, which may sometimes be referred to as a virtual machine monitor (VMM), is an application or software stack that allows for creating and running virtual machines 121. Accordingly, a hypervisor 111 can be configured to provide guest operating systems with a virtual operating platform, including virtualized hardware devices or resources, and manage the execution of guest operating systems within a virtual machine execution space provided by the hypervisor 111. In some instances, a hypervisor 111 may be configured to run directly on the hardware of the host machine 103 in order to control and manage the hardware resources of the host machine 103 provided to the virtual machines 121 resident on the host 103. In other instances, the hypervisor 111 can be implemented as an application executed by an operating system executed by the host 103, in which case the virtual machines 121 may run as a thread, task, or process of the hypervisor 111 or operating system. Examples of different types of hypervisors 111 include ORACLE VM SERVER™, MICROSOFT HYPER-V®, VMWARE ESX™ and VMWARE ESXi™, VMWARE WORKSTATION™, VMWARE PLAYER™, and ORACLE VIRTUALBOX®.

The hypervisor 111 can cause one or more processes, threads, or subroutines to execute in order to provide an appropriate level of functionality to individual virtual machines 121. For example, some instances of a hypervisor 111 could spawn individual host processes 123 to manage the execution of respective virtual machines 121. In other instances, however, the hypervisor 111 could manage the execution of all virtual machines 121 hosted by the hypervisor 111 using a single process. The host process 123 can provide for a host content module 126, which allows for a virtual machine 121 to send a request to the host process 123 for content 117 using various inter-process communication mechanisms. For example, a guest content module 129 installed on a virtual machine 129 could make a remote procedure call (RPC) to the host content module 126, and the host content module 126 could respond with another RPC to the guest content module 129.

The guest content module 129 acts as an interface to the host content module 126 for guest applications 131 executing on the virtual machine 121. Accordingly, the guest content module 129 may receive requests for content 117 from the guest application 131 and relay those requests to the host content module 126 using inter-process communication mechanisms, such as remote procedure calls. For example, the guest content module 129 could establish a hypertext transport protocol (HTTP) server hosted on the localhost interface of the virtual machine 121. Guest applications 131 aware of the HTTP server provided by the guest content module 129 could send an HTTP request for content 117 to the guest content module 129. The guest content module 129 could then invoke a remote procedure call to pass the request for the content 117 to the host content module 126. The guest content module 129 could subsequently receive the content 117 from the host content module 126 through a second remote procedure call, and then provide the content 117 to the requesting guest application 131 in an HTTP response.

The guest application 131 can be any application executed by the virtual machine 121 and capable of interacting with the guest content module 129 to request content 117. For example, the guest application 131 could include a library, plug-in, or module that allows the guest application 131 to be aware of the guest content module 129 and send a request to the guest content module 129. In this example, the library, plug-in, or module could allow the guest application 131 to make a specially formatted HTTP request for content 117 to the guest content module 129. However, any application hosted by the virtual machine 121 could send an HTTP request to the guest content module 129 if it were configured to use the appropriate port and localhost address.

The hypervisor 111 could also implement or otherwise provide a content proxy 133. The content proxy 133 can be executed to receive requests for content originating from a virtual machine 121 and relayed by the host content module 126 in communication with the virtual machine 121. The content proxy 133 can then provide the content 117 in response. For example, the content proxy 133 could provide the content 117 from a locally stored content cache 113, or it could retrieve the content 117 from a remote content store 136 hosted by the remote computing device 106. The remote content store 136 can be representative of a plurality of data stores, which can include relational databases, object-oriented databases, hierarchical databases, hash tables or similar key-value data stores, as well as other data storage applications or data structures.

The content 117 can represent any digital data or executable application which a virtual machine 121 or guest application 131 executing on the virtual machine 121 may request. Examples of content 117 can include configuration settings or files for the virtual machine 121 or the guest application 131, software updates or patches for the virtual machine 121 or guest applications 131, a new guest application 131 to be installed on the virtual machine 121, etc. For example, a newly created instance of a virtual machine 121 might request content 117 that includes a network configuration, security updates, and antivirus definition files. This content 117 could be requested while the virtual machine 121 lacks network connectivity (e.g., because the virtual machine 121 lacks a network configuration) or because the virtual machine 121 is quarantined from the network 109 (e.g., because the virtual machine violates a security policy that requires all software to be up-to-date).

The access policies 119 represent policies that specify access controls for individual items of content 117. For example, a host machine 103 in a share-tenant environment (e.g., virtual machines 121 are hosted on the same host machine 103 on behalf of multiple parties) might have one or more access policies 119 that limit access of specific virtual machines 121 to specific instances of content 117.

Next, a general description of the operation of the various components of the network environment 100 is provided. Although the following description provides an overview of the operation of the various components of the network environment 100, the various components can be operated in manners other than what is described. A more detailed description of the operation of individual components of the network environment 100 is provided in accompanying discussion of FIGS. 2-5.

To begin, a guest application 131 that is aware of the presence of the guest content module 129 can make a request for content 117 to the guest content module 129. The guest application 131 may be aware of the presence of the guest content module 129 due to the inclusion of a library, plugin, or module configured to use the guest content module 129. The request can be made, for example, by sending an HTTP request to the guest content module 129. The guest application 131 may request content using the guest content module 129 in response to a determination by the guest application 131 that the virtual machine 121 lacks access to the network 109 and, therefore, cannot directly access the content 117. The request can include a unique identifier for the content (e.g., a uniform resource locator (URL), a uniform resource identifier (URI), a universal unique identifier (UUID), or similar address) and potentially other information.

The guest content module 129 can then relay the request to the host content module 126. For example, the guest content module 129 may make an RPC call or use a similar inter-process communication mechanism to request the content 117 from the host content module 126. The relayed request can include a unique identifier for the content 117 (e.g., a uniform resource locator (URL), a uniform resource identifier (URI), a universal unique identifier (UUID), or similar address) and potentially other information. The guest content module 129 can then wait to receive a response from the host content module 126.

Upon receipt of the request from the guest content module 129, the host content module 126 can forward the request for the content 117 to the content proxy 133. For example, the host content module 126 may make an RPC call or use a similar inter-process communication mechanism to request the content 117 from content proxy 133. The relayed request can include the unique identifier for the content 117 and, in some implementations, an identifier of the host process 123 or virtual machine 121 that made the request. The host content module 126 can then wait for a response from the content proxy 133.

The content proxy 133 can then process the request for content 117. For example, the content proxy 133 may validate the unique identifier for the content 117. The content proxy 133 may also evaluate one or more access policies 119 to determine whether the host process 123 or virtual machine 121 that originated the request is allowed to receive or otherwise access the content 117. Assuming that the unique identifier is valid and the applicable access policies 119 indicate that the host process 123 or virtual machine 121 is permitted to access the content 117, the content proxy 133 can retrieve and provide the content 113 to the host content module 126. The host content module 126 can then return the content 117 to the guest content module 129, which relays the content 117 to the requesting guest application 131.

Figure 2:
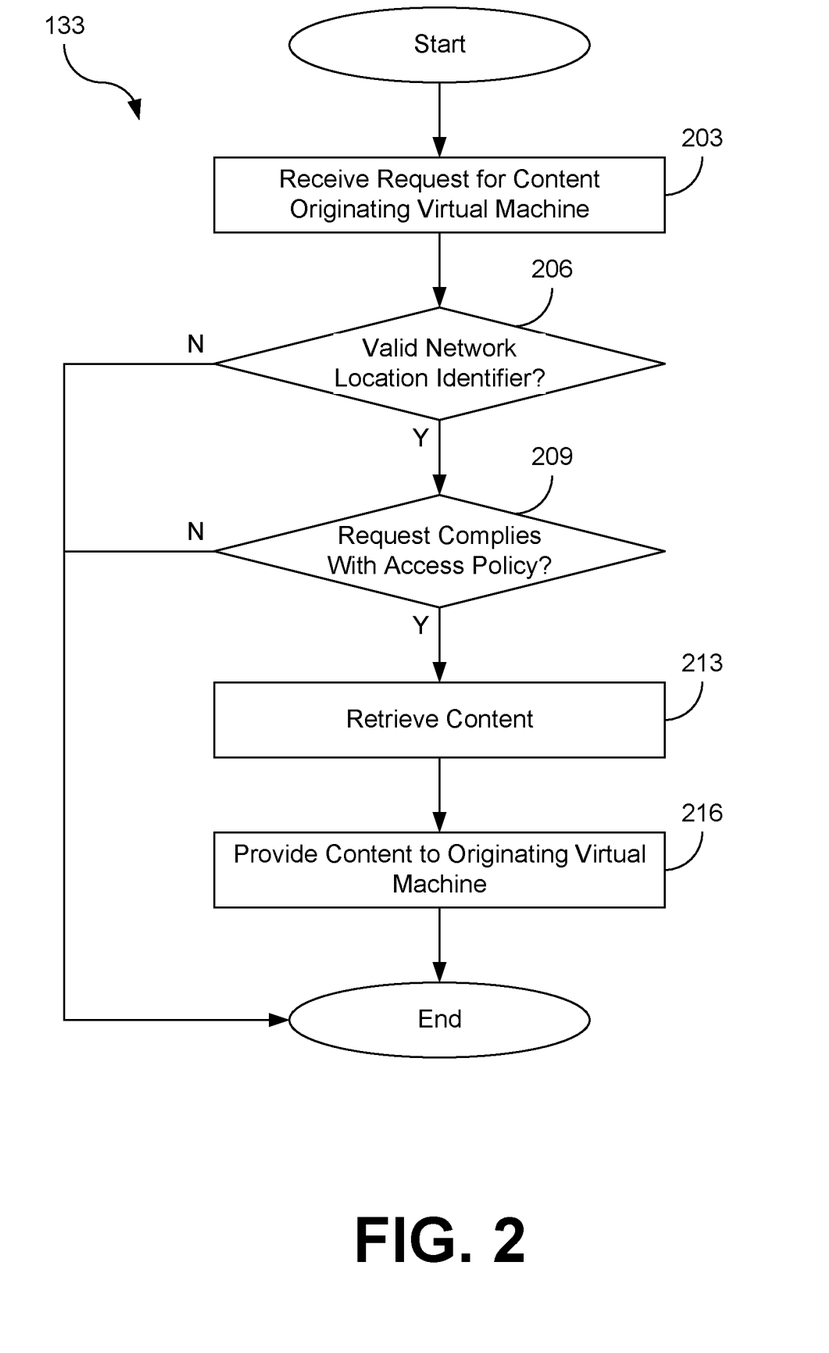
FIG. 2 is a flowchart illustrating one example of functionality implemented as portions of an application executed in a computing environment in the network environment of FIG. 1 according to various embodiments of the present disclosure.

Referring next to FIG. 2, shown is a flowchart that provides one example of the operation of a portion of the content proxy 133. It is understood that the flowchart of FIG. 2 provides merely an example of the many different types of functional arrangements that can be employed to implement the operation of the depicted portion of the content proxy 133. As an alternative, the flowchart of FIG. 2 can be viewed as depicting an example of elements of a method implemented within the network environment 100.

Beginning with step 203, the content proxy 133 can receive a request for content 117. The request can include a unique identifier for the content 117 and/or an identifier of the host process 123 or virtual machine 121 that originated the request for content 117. While the request for the content 117 ultimately originates from a virtual machine 121, the request can reach the content proxy 133 in several ways. For example, a host content module 126 within a host process 123 associated with a virtual machine 121 could use an inter-process communication mechanism, such as a remote procedure call, to provide the request to the content proxy 133. However, hypervisors 111 which allow for a single process to manage multiple virtual machines 121 (e.g., the hypervisor process itself), then the request could be received directly from the guest content module 129 executing within a virtual machine 121. Similarly, the guest content module 129 could use an inter-process communication mechanism, such as a remote procedure call, to provide the request to the content proxy 133.

Then at step 206, the content proxy 133 can determine whether the unique identifier provided in the request is valid. In a first example, the content proxy 133 could determine whether the unique identifier follows a specified or expected format. As a second example, wherein the unique identifier specifies a network location for content, the content proxy 133 could determine that the unique identifier directs or resolves to a valid domain or hostname. As another example, the content proxy 133 could determine whether the content 117 is available for the unique identifier provided in the request. If the unique identifier is valid, then the process proceeds to step 209. If it is invalid, then the process ends and the content proxy 133 can return an error message to the requesting process.

If the process proceeds to step 209, the content proxy 133 can determine whether the request for the content 117 complies with one or more applicable access policies 119. For example, the content proxy 133 could use the identifier of the host process 123 or virtual machine 121 that originated the request to identify applicable access policies 119. The content proxy 133 could then evaluate each access policy 119 for compliance. For example, if the identifier of the host process 123 or virtual machine 121 indicated that the virtual machine 121 was owned or operated by "Enterprise A," the content proxy 133 might permit the content 117 to be accessed if there were an access policy 119 that specified that virtual machines 121 operated by "Enterprise A" were allowed to access the content 117. Similarly, if an access policy 119 specified that the content 117 was limited to virtual machines 121 operated by "Enterprise B," then the content proxy 133 could deny access to the content 117 from virtual machines 121 operated by "Enterprise A." If an evaluation of the applicable access policies 119 indicates that the virtual machine 121 that originated the request for the content 117 is permitted to access the content 117, then the process can proceed to step 213. Otherwise, the process ends and the content proxy 133 can return an error message to the requesting process.

If the process proceeds to step 213, then the content proxy 133 can retrieve the content 117 on behalf of the virtual machine 121 that originated the request. In some implementations, the content proxy 133 may simply download or otherwise retrieve the content 117 for the unique identifier included in the request. However, the content proxy 133 may also take a tiered approach in other implementations. For example, the content proxy 133 could first check whether the content 117 is stored in a local content cache 113. If the content 117 is in the content cache 113, then the content proxy 133 could retrieve the content 117 from the content cache 113, which would generally be faster than downloading the content 117 from across the network 109. However, if the content 117 is not in the content cache 113 (e.g., because it has never been requested by a virtual machine 121 before), then the content proxy 133 could instead download or otherwise retrieve the content 117 from a remote content store 136 hosted by a remote computing device 106 in data communication with the host machine 103 across the network 109. Further, the content proxy 133 could store the content 117 in the content cache 113 for future accesses once the content 117 has been retrieved from the remote content store 136.

Finally, at step 216, the content proxy 133 can provide the content 117 as a response to the request received at step 203. For example, if the request were received from a host content module 126, then the response could be provided to the host content module 126 (e.g., as a response to a remote procedure call made by the host content module 126). Likewise, if the request were received from a guest content module 129 executed by a virtual machine 121, then the response could be provided to the guest content module 129 (e.g., as a response to the remote procedure call made by the guest content module 129). Once the content 117 is provided, the process can end.

Figure 3:
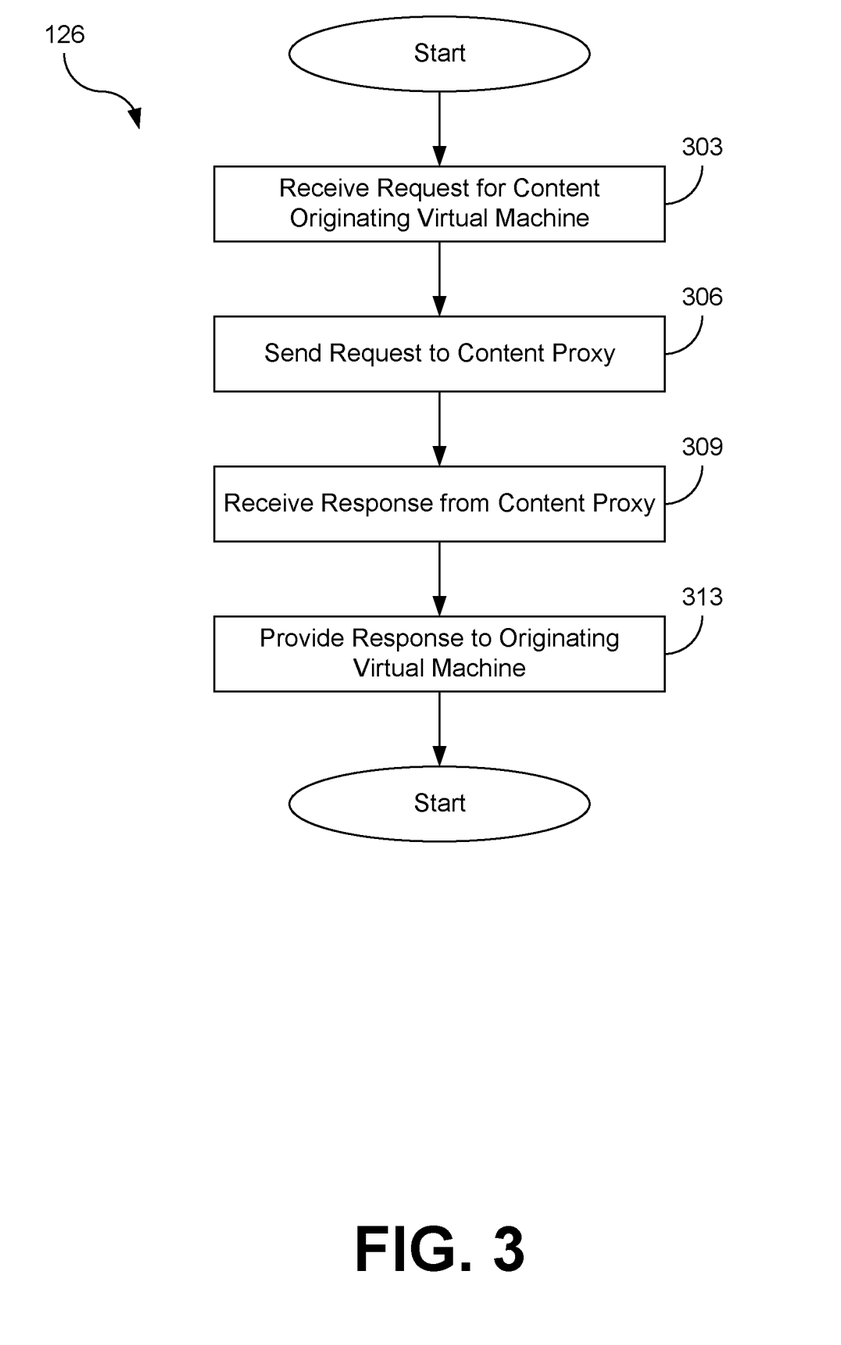
FIG. 3 is a flowchart illustrating one example of functionality implemented as portions of an application executed in a computing environment in the network environment of FIG. 1 according to various embodiments of the present disclosure.

Referring next to FIG. 3, shown is a flowchart that provides one example of the operation of a portion of the host content module 126. It is understood that the flowchart of FIG. 3 provides merely an example of the many different types of functional arrangements that can be employed to implement the operation of the depicted portion of the host content module 126. As an alternative, the flowchart of FIG. 3 can be viewed as depicting an example of elements of a method implemented within the network environment 100.

Beginning with step 303, the host content module 126 can receive a request for content 117 from a guest content module 129 executed by a virtual machine 121. For example, the host content module 126 may have received a first remote procedure call or other message using an inter-process communication mechanism. The request can include a unique identifier for the content 117 and, in some instances, an identifier of the virtual machine 121.

Then at step 306, the host content module 126 can send the request for the content 117 to the content proxy 133. For example, the host content module 126 could make a second remote procedure call or use another inter-process communication mechanism to provide the request to the content proxy 133. The request can include a unique identifier for the content 117 and, in some instances, an identifier of the virtual machine 121 or, alternatively, an identifier of the host process 123 that is implementing the host content module 126. The host content module 126 can then wait to receive a response from the content proxy 133.

Proceeding to step 309, the host content module 126 can receive a response from the content proxy 133. In some instances, the response can include the requested content 117. In other instances, the response may include an error message (e.g., an error indicating that the unique identifier is invalid, that access is prohibited by an access policy 119, etc.).

Finally, at step 313, the host content module 126 can provide the response to the guest content module 129 of the virtual machine 121 that originated the request for the content 117. For example, if the host content module 126 had received a remote procedure call from the guest content module 129, then the host content module 126 could include the response from the content proxy 133 in the response to the remote procedure call. This response could include the requested content 117 if the content 117 was received from the content proxy 133. Once the response is provided to the guest content module 129, then the process can end.

Figure 4:
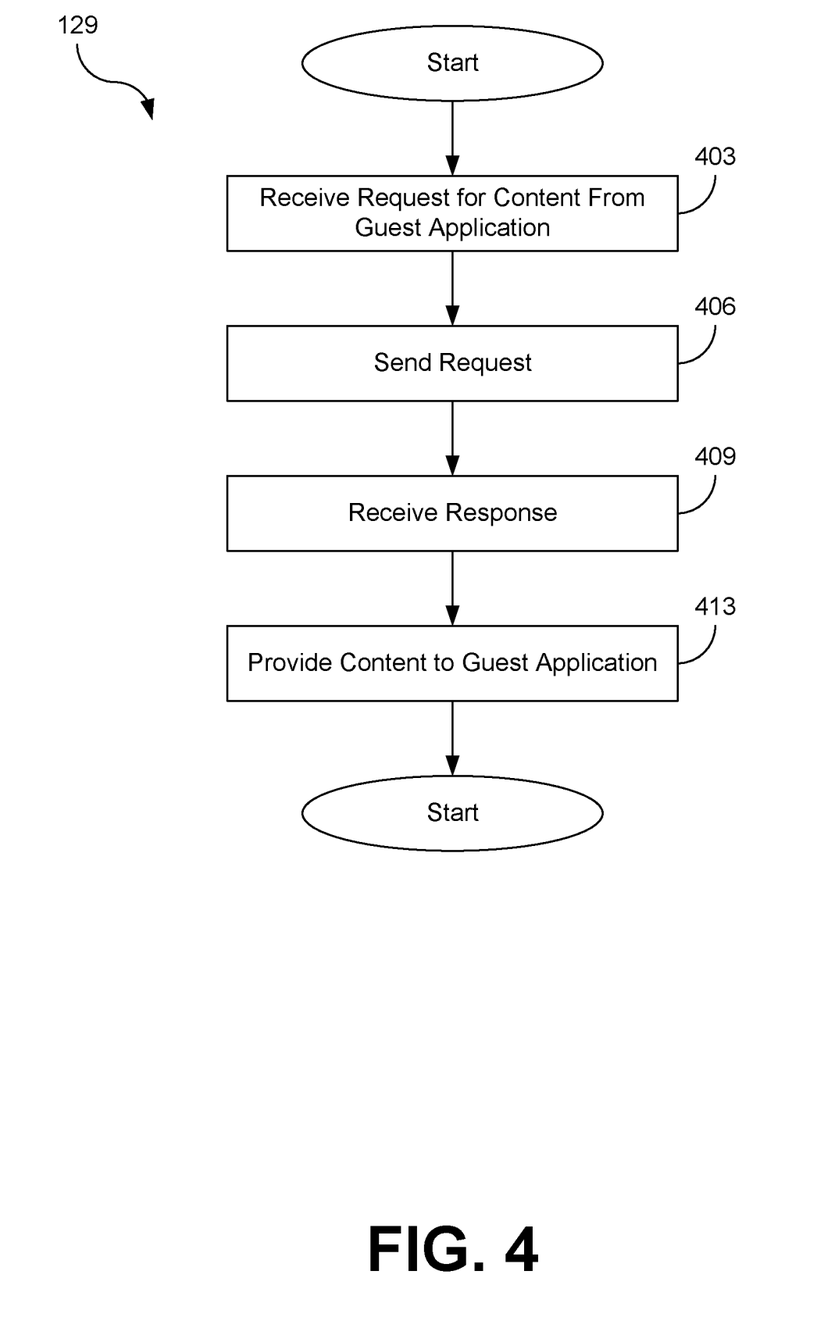
FIG. 4 is a flowchart illustrating one example of functionality implemented as portions of an application executed in a computing environment in the network environment of FIG. 1 according to various embodiments of the present disclosure.

Referring next to FIG. 4, shown is a flowchart that provides one example of the operation of a portion of the guest content module 129. It is understood that the flowchart of FIG. 4 provides merely an example of the many different types of functional arrangements that can be employed to implement the operation of the depicted portion of the guest content module 129. As an alternative, the flowchart of FIG. 4 can be viewed as depicting an example of elements of a method implemented within the network environment 100.

Beginning with step 403, the guest content module 129 can receive a request for content 117 from a guest application 131. For example, the guest content module 129 may have previously bound an HTTP server to a port on a localhost address (e.g. any address within the 127.0.0.0/8 IPv4 address block). Accordingly, the guest content module 129 could receive an HTTP request for content 117 from the guest application 131 through the HTTP server provided by the guest content module 129.

Then at step 406, the guest content module 129 can request the content 117 on behalf of the guest application 131. For example, the guest content module 129 could make a remote procedure call or use a similar inter-process communication mechanism to provide the request for the content 117 to a respective host content module 126. In other implementations, however, the guest content module 129 could make a remote procedure call or use a similar inter-process communication mechanism to provide the request directly to the content proxy 133. In either implementation, the guest content module 129 could include a unique identifier for the content 117 and potentially an identifier of the virtual machine 121 that is executing the guest content module 129.

Next at step 409, the guest content module 129 can receive a response to the request that was made at step 406. The response can include either the content 117 that was requested or one or more error codes indicating why the response does not include the content 117. Examples of error codes can include that the connection was terminated or timed out, or that the content was unavailable. If an error code indicated that the connection was terminated or timed out, the guest content module 129 or guest application 131 could attempt to connect again.

Subsequently at step 413, the guest content module 129 can provide a response, which can include the content 117 or error codes received at step 409, to the guest application 131. For example, the guest content module 129 could assemble an HTTP response that includes the content 117 and provide the HTTP response to the guest application 131 that made the original request for content 117 at step 403. Once the HTTP response is provided to the guest application 131, then the process can end.

Figure 5:
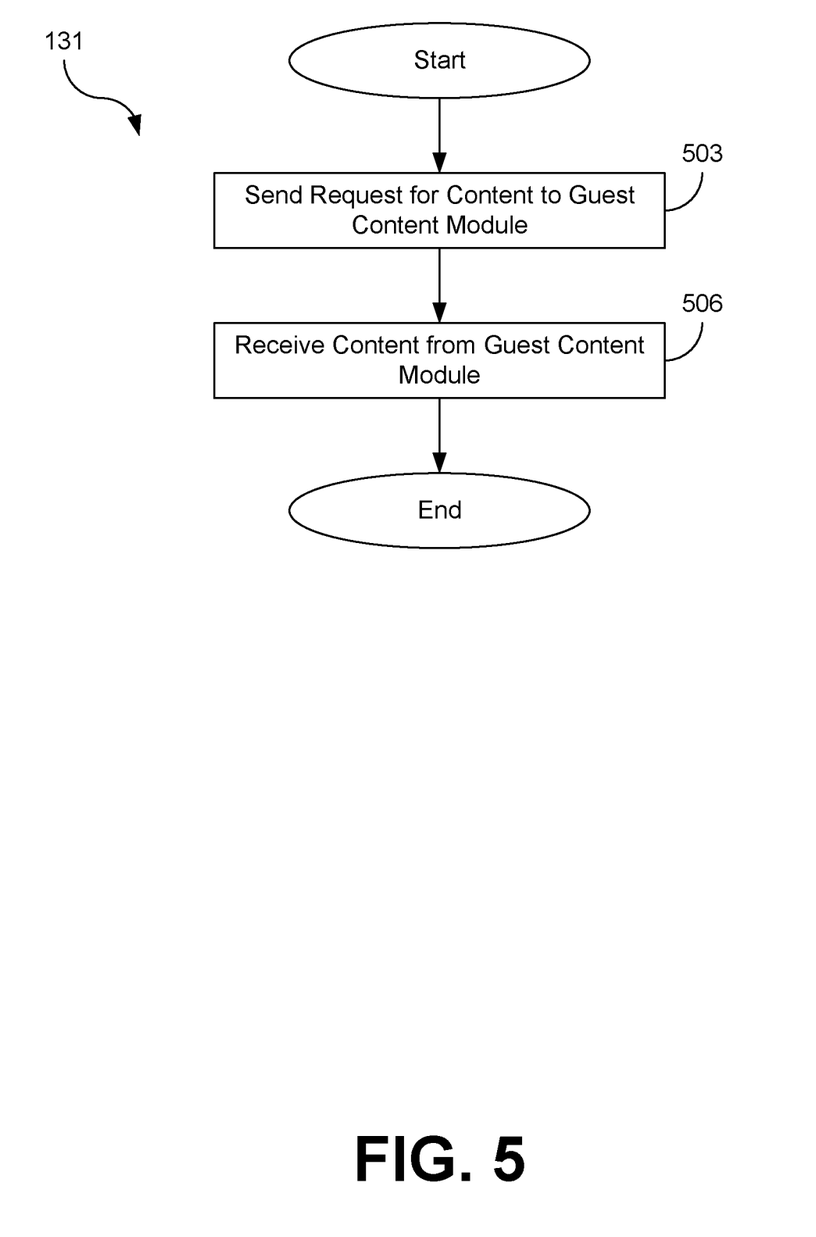
FIG. 5 is a flowchart illustrating one example of functionality implemented as portions of an application executed in a computing environment in the network environment of FIG. 1 according to various embodiments of the present disclosure.

Referring next to FIG. 5, shown is a flowchart that provides one example of the operation of a portion of the guest application 131. It is understood that the flowchart of FIG. 5 provides merely an example of the many different types of functional arrangements that can be employed to implement the operation of the depicted portion of the guest application 131. As an alternative, the flowchart of FIG. 5 can be viewed as depicting an example of elements of a method implemented within the network environment 100.

Beginning with step 503, the guest application 131 can send a request for content 117 to the guest content module 129. For example, the guest application 131 could send an HTTP request for the content 117 to an HTTP server provided by the guest content module 129 on the localhost address of the virtual machine 121. As a result, the guest application 131 can request or access content 117 regardless of whether the virtual machine 121 has access to the network 109.

However, not every guest application 131 is necessarily aware of the presence of the guest content module 129. Accordingly, a guest application 131 could include, incorporate, or otherwise make use of a library, module, plug-in, etc. that is configured to search for or send requests to the HTTP server provided by the guest content module 129.

Then at step 506, the guest application 131 can receive a response from the guest content module 129. For example, the guest application 131 could receive an HTTP response from the HTTP server implemented by the guest content module 129. The response could include the requested content 117 or an error message indicating why the content 117 could not be accessed (e.g., an invalid unique identifier, an access policy 119. Once the response is received, the content 117 can be used by the guest application 131 and the process can end.

A number of software components previously discussed are stored in the memory of the respective computing devices and are executable by the processor respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a first computing device comprising a processor and a memory; and
   machine-readable instructions stored in the memory that, when executed by the processor, cause the first computing device to at least:
      receive a first request for content, wherein the first request:
         originates from a first virtual machine hosted by the first computing device, wherein the first virtual machine is prohibited from accessing a network of the first computing device,
         comprises a unique identifier for the content, and
         is received from the first virtual machine through an inter-process communication mechanism;
      validate the unique identifier;
      determine that the first computing device has failed to receive the content;
      retrieve, in response to determining that the first computing device has failed to receive the content, the content from a second computing device using the unique identifier;
      provide the content to the first virtual machine in response to validation of the unique identifier, the content being provided to the first virtual machine through the inter-process communication mechanism;
      receive a second request for the content, wherein the second request:
         originates from a second virtual machine hosted by the first computing device,
         comprises the unique identifier for the content, and
         is received from the second virtual machine through the inter-process communication mechanism;
      validate the unique identifier of the second request;
      determine that the first computing device has already received the content; and
      provide the content to the second virtual machine in response to validating the unique identifier of the second request, the content being provided to the second virtual machine through the inter-process communication mechanism.

2. The system of claim 1, wherein the machine-readable instructions, when executed by the processor, cause the first computing device to at least retrieve the content from the second computing device, wherein the content is identified by the unique identifier.

3. The system of claim 1, wherein the machine-readable instructions, when executed by the processor, cause the first computing device to at least
   determine the content has been previously retrieved for the unique identifier and stored in a content cache stored in the memory of the first computing device; and
   retrieve the content from the content cache.

4. The system of claim 1, wherein the machine-readable instructions, when executed by the processor, cause the first computing device to determine that the first virtual machine is authorized to access the content based at least in part on an evaluation of at least one policy associated with the content or the unique identifier.

5. The system of claim 1, wherein a present configuration of the first virtual machine renders the network inaccessible to the first virtual machine.

6. The system of claim 1, wherein the inter-process communication mechanism is a remote procedure call from a guest client executed by the first virtual machine.

7. The system of claim 1, wherein the first virtual machine is prohibited from accessing the network as a result of violating a security policy that requires a specified software to match a specified version.

8. A method implemented with a first computing device, comprising:
   receiving a first request for content, wherein the first request:
      originates from a first virtual machine hosted by the first computing device, wherein the first virtual machine is prohibited form accessing a network of the first computing device,
      comprises a unique identifier for the content, and
      is received from the first virtual machine through an inter-process communication mechanism;
   validating the unique identifier;
   determining that the first computing device has failed to receive the content;
   retrieving, in response to determining that the first computing device has failed to receive the content, the content from a second computing device using the unique identifier;
   providing a copy of the content to the first virtual machine in response to validation of the unique identifier, the content being provided to the first virtual machine through the inter-process communication mechanism;
   receiving a second request for the content, wherein the second request:
      originates from a second virtual machine hosted by the first computing device,
      comprises the unique identifier for the content, and
      is received from the second virtual machine through the inter-process communication mechanism;
   validating the unique identifier of the second request;
   determining that the first computing device has already received the content; and
   providing the content to the second virtual machine in response to validating the unique identifier of the second request, the content being provided to the second virtual machine through the inter-process communication mechanism.

9. The method of claim 8, wherein the method further comprises retrieving the content from the second computing device, wherein the content is identified by the unique identifier.

10. The method of claim 8, further comprising:
    determining the content has been previously retrieved for the unique identifier and stored in a content cache stored in a memory of the first computing device; and
    retrieving the content from the content cache.

11. The method of claim 8, further comprising determining that the first virtual machine is authorized to access the content based at least in part on an evaluation of at least one policy associated with the content or the unique identifier.

12. The method of claim 8, wherein a present configuration of the first virtual machine renders the network inaccessible to the first virtual machine.

13. The method of claim 8, wherein the inter-process communication mechanism is a remote procedure call from a guest client executed by the first virtual machine.

14. The method of claim 8, wherein the first virtual machine is prohibited from accessing the network as a result of violating a security policy that requires a specified software to match a specified version.

15. A non-transitory, computer-readable medium, comprising machine-readable instructions that, when executed by a processor of a first computing device, cause the first computing device to at least:
  receive a first request for content, wherein the first request:
    originates from a first virtual machine hosted by the first computing device, wherein the first virtual machine is prohibited form accessing a network of the first computing device,
    comprises a unique identifier for the content, and
    is received from the first virtual machine through an inter-process communication mechanism;
  validate the unique identifier;
  determine that the first computing device has failed to receive the content;
  retrieve, in response to determining that the first computing device has failed to receive the content, the content from a second computing device using the unique identifier; and
  provide a copy of the content to the first virtual machine in response to validation of the unique identifier, the content being provided to the first virtual machine through the inter-process communication mechanism;
  receive a second request for the content, wherein the second request:
    originates from a second virtual machine hosted by the first computing device,
    comprises the unique identifier for the content, and
    is received from the second virtual machine through the inter-process communication mechanism;
  validate the unique identifier of the second request;
  determine that the first computing device has already received the content; and
  provide the content to the second virtual machine in response to validating the unique identifier of the second request, the content being provided to the second virtual machine through the inter-process communication mechanism.

16. The non-transitory, computer-readable medium of claim 15, wherein a present configuration of the first virtual machine renders the network inaccessible to the first virtual machine.

17. The non-transitory, computer-readable medium of claim 15, wherein the inter-process communication mechanism is a remote procedure call from a guest client executed by the first virtual machine.

18. The non-transitory, computer-readable medium of claim 15, wherein the machine-readable instructions, when executed by the processor, cause the first computing device to at least retrieve the content from the second computing device, wherein the content is identified by the unique identifier.

19. The non-transitory, computer-readable medium of claim 15, wherein the machine-readable instructions, when executed by the processor, cause the first computing device to at least:
  determine the content has been previously retrieved for the unique identifier and stored in a content cache stored in a memory of the first computing device; and
  retrieve the content from the content cache.

20. The non-transitory, computer-readable medium of claim 15, wherein the machine-readable instructions, when executed by the processor, cause the first computing device to determine that the first virtual machine is authorized to access the content based at least in part on an evaluation of at least one policy associated with the content or the unique identifier.

* * * * *